(12) United States Patent
Liu et al.

(10) Patent No.: US 11,383,862 B2
(45) Date of Patent: Jul. 12, 2022

(54) AUTOMATIC PACKING MACHINE FOR EXPRESS DELIVERY AND AUTOMATIC PACKING METHOD FOR EXPRESS DELIVERY

(71) Applicant: Binzhou University, Binzhou (CN)

(72) Inventors: Jing Liu, Binzhou (CN); Pengchuan Liu, Binzhou (CN); Qingfa Lu, Binzhou (CN); Xiaowu Zhu, Binzhou (CN); Jianmeng Cao, Binzhou (CN); Ruiyang Sun, Binzhou (CN)

(73) Assignee: Binzhou University, Binzhou (CN)

( * ) Notice: Subject to any disclaimer, the term of this patent is extended or adjusted under 35 U.S.C. 154(b) by 0 days.

(21) Appl. No.: 17/106,117

(22) Filed: Nov. 29, 2020

(65) Prior Publication Data

US 2021/0130024 A1    May 6, 2021

Related U.S. Application Data

(63) Continuation of application No. PCT/CN2020/123078, filed on Oct. 23, 2020.

(30) Foreign Application Priority Data

Nov. 1, 2019    (CN) .......................... 201911059518.1

(51) Int. Cl.
*B65B 5/02*    (2006.01)
*B65B 65/00*    (2006.01)
(Continued)

(52) U.S. Cl.
CPC .............. *B65B 5/024* (2013.01); *B65B 43/10* (2013.01); *B65B 43/145* (2013.01);
(Continued)

(58) Field of Classification Search
CPC .. B65B 5/02; B65B 5/024; B65B 5/04; B65B 7/20; B65B 7/2864; B65B 35/12;
(Continued)

(56) References Cited

U.S. PATENT DOCUMENTS 4,951,445 A * 8/1990 Thibault ............... B65B 51/067
53/167
6,477,819 B1 * 11/2002 Focke et al. ............ B65B 51/06
493/12
2021/0261281 A1 * 8/2021 Engleman et al. ... B65B 59/001

FOREIGN PATENT DOCUMENTS

CN        105947303 A  *  9/2016  .......... B65B 51/067
CN        206599037 U  *  10/2017
(Continued)

*Primary Examiner* — Stephen F. Gerrity

(57) ABSTRACT

An automatic packing machine and automatic packing method for express delivery are provided. The automatic packing machine for express delivery includes: a frame; a box discharging mechanism, fixed to the frame; a weighing mechanism, fixed to the frame, the weighing mechanism including a weighing plate and a weighing plate steering engine which are arranged in coordination and an image collecting module, the weighing plate steering engine and the image collecting module being fixed to the frame, and the image collecting module facing the weighing plate; a box body unfolding mechanism; a box closing mechanism; a conveying mechanism; and a controller, connected to all other structures of the automatic packing machine for express delivery. Through the technical solutions of the present invention, multiple functions are integrated, the degree of automation is high, and different items are packaged by using different box bodies.

10 Claims, 9 Drawing Sheets

(51) Int. Cl.
*B65B 59/02* (2006.01)
*B65B 57/10* (2006.01)
*B65B 43/10* (2006.01)
*B65B 43/26* (2006.01)
*B65B 43/32* (2006.01)
*B65B 51/06* (2006.01)
*B65B 43/14* (2006.01)
*B65B 43/30* (2006.01)

(52) U.S. Cl.
CPC .......... *B65B 43/265* (2013.01); *B65B 43/305* (2013.01); *B65B 43/325* (2013.01); *B65B 51/06* (2013.01); *B65B 51/067* (2013.01); *B65B 57/10* (2013.01); *B65B 59/02* (2013.01); *B65B 65/003* (2013.01); *B65B 2210/04* (2013.01)

(58) Field of Classification Search
CPC ..... B65B 43/10; B65B 43/126; B65B 43/145; B65B 43/225; B65B 43/265; B65B 43/285; B65B 43/305; B65B 43/325; B65B 43/52; B65B 49/08; B65B 51/06; B65B 51/067; B65B 57/10; B65B 57/12; B65B 59/001; B65B 59/003; B65B 59/02; B65B 61/28; B65B 65/003; B65B 2210/04; G01G 19/005; G01G 21/22
See application file for complete search history.

(56) References Cited

FOREIGN PATENT DOCUMENTS

| | | | | |
|---|---|---|---|---|
| CN | 206664992 U | * | 11/2017 | |
| CN | 110217440 A | * | 9/2019 | |
| CN | 110654635 A | * | 1/2020 | |
| CN | 210853179 U | * | 6/2020 | |
| WO | WO-2014088163 A1 | * | 6/2014 | ........... B65B 51/067 |
| WO | WO-2018188833 A1 | * | 10/2018 | ............. B65B 5/024 |

* cited by examiner

AUTOMATIC PACKING MACHINE FOR EXPRESS DELIVERY AND AUTOMATIC PACKING METHOD FOR EXPRESS DELIVERY

CROSS-REFERENCE TO RELATED APPLICATIONS

This application is a continuation of International Patent Application No. PCT/CN2020/123078, filed on Oct. 23, 2020, which claims the benefit of priority from Chinese Application No. 201911059518.1, filed on Nov. 1, 2019. The entire contents of the aforementioned applications, including any intervening amendments thereto, are incorporated herein by reference.

TECHNICAL FIELD

The present invention relates to the technical field of packaging machinery, and particularly to an automatic packing machine for express delivery and an automatic packing method for express delivery.

BACKGROUND

With the rapid development of e-commerce, the trading volume of commodities is increasing, and automatic packaging equipment gradually appears. However, the existing packing machine for express delivery still needs to combine manual and automatic methods in the packing for express delivery, which has the following technical defects:

(1) Stability and reliability are poor, the degree of automation is low, and the work efficiency is low.

(2) It is difficult to implement automatic weighing and box selection, so it can only be operated for boxes of the same specification, with poor adaptability.

SUMMARY OF THE INVENTION

The present invention aims to solve at least one of the technical problems existing in the prior art or related art.

To this end, an objective of the present invention is to provide an automatic packing machine for express delivery.

Another objective of the present invention is to provide an automatic packing method for express delivery.

In order to achieve the above objectives, technical solutions of the present invention provide an automatic packing machine for express delivery, including: a frame; a box discharging mechanism, fixed to one side of the top end of the frame; a weighing mechanism, fixed to a middle-upper part of the frame, the weighing mechanism being adjacent to the box discharging mechanism, the weighing mechanism including a weighing plate and a weighing plate steering engine which are arranged in coordination, the weighing plate steering engine being fixed to a cross rod on the middle-upper part of the frame, the weighing plate being fixed to the weighing plate steering engine, the weighing mechanism further including an image collecting module, the image collecting module being fixed to a cross rod at the top end of the frame, and the image collecting module facing the weighing plate and being located over the weighing plate; a box body unfolding mechanism, fixed to a middle-lower part of the frame, the box body unfolding mechanism and the box discharging mechanism being arranged in coordination, and the box body unfolding mechanism corresponding to a box discharging port of the box discharging mechanism and being configured to unfold a box body discharged out of the box discharging port; a box closing mechanism, fixed to the middle-lower part of the frame, the box closing mechanism being arranged in coordination with the box body unfolding mechanism and being configured to close the unfolded box body moved by the box body unfolding mechanism; a box sealing mechanism, including upper and lower box sealing devices, wherein the upper sealing device is fixed to the middle-upper part of the frame, a fixed position height of the upper box sealing device is lower than that of the weighing mechanism, the lower box sealing device is fixed to the middle-lower part of the frame, and the box sealing mechanism is arranged in coordination with the box body unfolding mechanism and the box closing mechanism and is configured to seal the closed box body; a conveying mechanism, fixed to the bottom of the frame and configured to convey the sealed box body, the conveying mechanism including; a box clamping device and a box clamping device push rod motor arranged in coordination and fixedly connected to the frame, an output end of the box clamping device push rod motor being fixedly connected to the box clamping device; a box body conveyor belt, fixedly connected to one side at the bottom end of the frame; and a box storage warehouse, connected to the box body conveyor belt; and a controller, connected to the box discharging mechanism, the weighing mechanism, the box body unfolding mechanism, the box closing mechanism, the box sealing mechanism, and the conveying mechanism respectively.

In the solution, the box discharging mechanism, the weighing mechanism, the box body unfolding mechanism, the box closing mechanism, the box sealing mechanism, and the conveying mechanism are relatively compact in structure, which can effectively improve the efficiency of automatic packing. Moreover, the coordination between these mechanical structures and the controller improves the automation of the whole packing for express delivery, and the unfolding process of the box body is stable and reliable, with less loss to the machine, which improves the stability and reliability of the automatic packing machine for express delivery as a whole, reduces the failure rate of the machine to some extent, and prolongs the service life of the machine. Besides, the automatic packing machine for express delivery is low in production costs and suitable for mass production.

Particularly, a to-be-packed item is placed on the weighing plate of the weighing mechanism for weighing the to-be-packed item, the image collecting module analyzes the size of the to-be-packed item and feeds back it to the box discharging mechanism, the box discharging mechanism discharges a box according to the size of the to-be-packed item fed back by the image collecting module, the box body unfolding mechanism unfolds a box body discharged out of the box discharging port, the box closing mechanism closes a bottom surface of the unfolded box body moved from the box body unfolding mechanism, the weighing plate steering engine rotates to tilt the weighing plate, the to-be-packed item slips into the box body, the box closing mechanism closes a top surface of the box body, the box sealing mechanism seals the closed box body, and the conveying mechanism conveys the sealed box body.

It should be noted that the image collecting module herein may be an openMV machine vision module. Particularly, with an STM32F427CPU single chip microcomputer as a control core and integrated with an OV7725 camera technology, a camera can collect images of to-be-packed items, sizes of the to-be-packed items are judged for classification through a machine vision algorithm, such as pixel size, the STM32F427CPU single chip microcomputer gives the box discharging mechanism an instruction according to the sizes and categories of the to-be-packed items, and the box discharging mechanism performs an operation of discharging box bodies with different specifications.

Preferably, the box discharging mechanism includes: a folding box storage portion, fixed to one side of the top end of the frame; an elastic box pressing plate, fixed to an inner side of a sidewall of the folding box storage portion and configured to extrude a box body in a folded state; a box discharging conveyor belt and a box discharging conveyor belt motor arranged in coordination and arranged in the folding box storage portion, the extruded box body in the folded state being between the box discharging conveyor belt and the elastic box pressing plate; and the box discharging port, arranged adjacent to the box discharging conveyor belt and located between the box discharging conveyor belt and the elastic box pressing plate, wherein the box discharging conveyor belt motor drives the box discharging conveyor belt to rotate and then takes the box body in the folded state out of the box discharging port.

In this solution, a box body in a folded state can be accommodated and stored through the folding box storage portion, and the box body in the folded state is extruded through the elastic box pressing plate fixed to an inner side of a sidewall of the folding box storage portion, which, on the one hand, with the decrease in the number of box bodies, causes the following box bodies to move toward the box discharging conveyor belt, and on the other hand, when the box discharging conveyor belt does not operate, effectively reduces occurrence of free fall of the box bodies, can take the box body in the folded state out of the box discharging port through coordination between the box discharging conveyor belt, the box discharging conveyor belt motor, and the box discharging port, basically guarantees taking out a single box body, facilitates the implementation of subsequent operations such as box unfolding, and ensures high stability and reliability of box discharging.

Preferably, two sets of box discharging conveyor belts and box discharging conveyor belt motors arranged adjacent to each other divide the folding box storage portion into two folding box storage spaces; there are two sets of elastic box pressing plates, arranged on inner sides of sidewalls of the two folding box storage spaces respectively, and arranged corresponding to the box discharging conveyor belts; and two box discharging ports arranged in coordination with the elastic box pressing plates and the box discharging conveyor belts form two sets of box discharging components that one-to-one correspond to the two folding box storage spaces and are configured to discharge box bodies in the folding box storage spaces.

In this solution, two sets of box discharging conveyor belts and box discharging conveyor belt motors are arranged to divide the folding box storage portion into two folding box storage spaces, and two sets of elastic box pressing plates and the box discharging ports form two sets of box discharging components, which can implement operations of discharging box bodies of different specifications, then present box bodies of different specifications according to sizes of to-be-packed items, and implements automatic packing of items of various sizes and types on the same automatic packing machine for express delivery, thereby having high work efficiency.

In addition, structural layout can be performed according to requirements, and multiple sets of box discharging components can be arranged to implement operations of discharging box bodies of more specifications.

Preferably, the two box discharging ports have different widths, and the width of the box discharging port matches the thickness of a single box body in a folded state placed in the corresponding folding box storage space.

In this solution, the width of the box discharging port matches the thickness of a single box body in a folded state placed in the corresponding folding box storage space. Herein, the two box discharging ports have different widths to match discharging of box bodies of two different specifications. For example, the width of one box discharging port is 9 mm, and the width of the other box discharging port is 6 mm.

Preferably, the box body unfolding mechanism includes two adsorption devices arranged opposite to each other, and each of the adsorption devices includes a telescopic mechanism, a transverse moving mechanism, and a longitudinal moving mechanism arranged in coordination, the telescopic mechanism includes: a ball screw and an optical shaft arranged in coordination and fixed to the frame through a support seat; a telescopic frame fixed sliding block, sleeving the ball screw and the optical shaft, the ball screw being connected to an unfolding mechanism motor that drives the box body unfolding mechanism through the telescopic frame fixed sliding block to move as a whole; two opposite telescopic frame support plates, denoted as a first telescopic frame support plate and a second telescopic frame support plate respectively, the first telescopic frame support plate being fixed to a side surface of the telescopic frame fixed sliding block; an embedded pin, clamped into a sliding slot on the telescopic frame support plate, the embedded pin being connected to a telescopic rod push rod motor, and driven by the telescopic rod push rod motor, the embedded pin moving along the sliding slot on the telescopic frame support plate; a telescopic rod, two ends of the telescopic rod being rotationally connected to the embedded pin, and the embedded pin driving the telescopic rod to move, upper and lower transverse moving mechanisms are arranged, each of the transverse moving mechanisms includes: a transverse ball screw, fixed to a transverse ball screw support plate through a bearing housing; a transverse sliding block, sleeving the transverse ball screw; a sucker transverse motion motor, connected to the transverse ball screw, the sucker transverse motion motor driving the transverse ball screw to rotate, and the transverse sliding block moving along the transverse ball screw; a sucker, fixedly connected to the transverse sliding block, and the longitudinal moving mechanism includes: a longitudinal ball screw support plate, fixedly connected to the second telescopic frame support plate; a longitudinal ball screw, fixed to the longitudinal ball screw support plate; a sucker longitudinal motion motor, connected to the longitudinal ball screw; and a longitudinal sliding block, sleeving the longitudinal ball screw, the longitudinal sliding block moving up and down along the longitudinal ball screw, and the transverse ball screw support plate being fixed to the longitudinal sliding block; the sucker longitudinal motion motor and the sucker transverse motion motor being connected to the controller, being capable of receiving size information of the box body sent by a box discharging control device, and adaptively adjusting transverse and longitudinal spacing of the suckers according to the size information of the box body.

In this solution, the box body unfolding mechanism includes two adsorption devices arranged opposite to each other, and each of the adsorption devices includes a telescopic mechanism, a transverse moving mechanism, and a longitudinal moving mechanism arranged in coordination. The transverse moving mechanism and the longitudinal moving mechanism can transverse and longitudinal movement of the box body unfolding mechanism and adjust adsorption positions on the box body, so that the unfolding process of the box body is more stable and reliable, with less loss to the machine, which reduces the failure rate of the machine and prolongs the service life of the machine.

Particularly, the unfolding mechanism motor rotates to drive the box body unfolding mechanism through the telescopic frame fixed sliding block to move as a whole. Under the action of the sucker transverse motion motor, the transverse ball screw rotates, the transverse sliding block moves along the transverse ball screw, and transverse spacing of the sucker is adjusted. Driven by the sucker longitudinal motion motor, the longitudinal ball screw drives the transverse ball screw support plate to move along the longitudinal ball screw, so as to adjust longitudinal spacing of the upper and lower suckers. The transverse and longitudinal spacing of the suckers are adjusted to implement smooth adsorption of box bodies of different specifications. The two adsorption devices are adsorbed on two sides of the box body, the telescopic rod expands or contracts under the action of the telescopic rod push rod motor to implement box unfolding, and the unfolded box body moves to a box closing working area with the two adsorption devices.

Preferably, the box closing mechanism includes: an upper box closing tool steering engine and a lower box closing tool steering engine arranged in coordination and fixed to the frame; an upper box closing tool and a lower box closing tool, correspondingly fixedly mounted to output ends of the upper box closing tool steering engine and the lower box closing tool steering engine; an upper box closing fan blade steering engine and a lower box closing fan blade steering engine arranged in coordination and fixed to the transverse ball screw support plate; and an upper box closing fan blade and a lower box closing fan blade, correspondingly connected to output ends of the upper box closing fan blade steering engine and the lower box closing fan blade steering engine.

In this solution, the upper box closing tool steering engine drives the upper box closing tool to rotate by a particular angle to complete a box closing action of two corresponding box body blades, and the upper box closing fan blade steering engine drives the upper box closing fan blade to rotate to complete a box closing action of the other two corresponding box body blades, so as to implement closing of the top surface of the box body. Likewise, the lower box closing tool steering engine drives the lower box closing tool to rotate by a particular angle to complete a box closing action of two corresponding box body blades, and the lower box closing fan blade steering engine drives the lower box closing fan blade to rotate to complete a box closing action of the other two corresponding box body blades, so as to implement closing of the bottom surface of the box body. The box closing stability is better, the box closing effect is better, and the box closing consistency is better.

More particularly, the lower box closing tool steering engine drives the lower box closing tool to rotate by a particular angle to complete sealing of two blades on the bottom surface of the box body, and then the lower box closing fan blade steering engine drives the lower box closing fan blade to rotate to complete sealing of the other two blades on the bottom surface of the box body. After the item enters the box body, the upper box closing tool steering engine drives the upper box closing tool to rotate by a particular angle to complete sealing of two blades on the top surface of the box body, then the upper box closing fan blade steering engine drives the upper box closing fan blade to rotate to complete sealing of the other two blades on the top surface of the box body, and finally the upper box closing tool and the lower box closing tool are restored to an original position under the driving of the corresponding steering engine.

Preferably, the box sealing mechanism includes an upper sealing device and a lower sealing device configured to seal upper and low box openings respectively, the sealing device including: a box sealing device optical shaft and a rack arranged in coordination and fixedly connected to the frame; a box sealing device, arranged on the rack through a gear, and moving along the rack under engagement of the gear and the rack; and a box sealing device driving motor, connected to the gear, and configured to drive the gear to move along the rack and drive the box sealing device to horizontally move.

In this solution, the upper and lower box openings are sealed through the upper sealing device and the lower sealing device, and the sealing device consists of a box sealing device optical shaft, a rack, a box sealing device, and a box sealing device driving motor. The device is simple, and has a good sealing effect and a high degree of automation Preferably, the box sealing device includes: a box sealing device body; a box sealing device sliding block, sleeving the box sealing device optical shaft, and connected to the box sealing device driving motor through a U-shaped bracket; a box sealing device side plate, fixedly connected to the box sealing device sliding block; a box sealing device rotating shaft running through the box sealing device body, and two ends thereof being connected to the box sealing device side plate; a tape roller and a tape pressing roller arranged in coordination and arranged in the box sealing device body; a tension spring, of which one end is connected to one end at the top of an I-shaped bracket, and the other end is connected to the box sealing device body; and a rubber tapping tool, arranged on the box sealing device body and arranged in coordination with the tape pressing roller.

More particularly, before box sealing, a section of a tape on the tape roller extends out, and a non-viscous surface of the extended tape is overlaid on the tape pressing roller. Driven by the box sealing device driving motor, the gear drives the box sealing device to horizontally move. Box sealing starts when a viscous surface of the tape comes into contact with a side surface of the box body. The box sealing device is extruded by the box body to clockwise rotate around the box sealing device rotating shaft, and the tension spring is under a tensile state. At the same time, the tape pressing roller presses the tape on the box body, and as the box sealing device continues to move horizontally, the tape is constantly pulled out and stuck on the box body to complete packaging of the upper surface. The box sealing device continues to move forward away from the upper surface of the box body, and the tape pressing roller then attaches the tape to the side surface of the other end of the box body. When the tension spring is pulled to a particular extent, the tension spring drives the box sealing device to rotate counterclockwise around the box sealing device rotating shaft, and the rubber tapping tool then cuts off the tape to complete a sealing operation on the upper surface. The sealing operation on the lower surface of the box body is completed by the lower box sealing device. The principle and sealing process are the same as the sealing of the upper surface of the box body, and are not described in detail here.

Preferably, the conveying mechanism includes: a box clamping device and a box clamping device push rod motor arranged in coordination and fixedly connected to the frame, an output end of the box clamping device push rod motor being fixedly connected to the box clamping device; a box body conveyor belt, fixedly connected to one side at the bottom end of the frame; and a box storage warehouse, connected to the box body conveyor belt.

Preferably, the box clamping device includes: a box clamping device support, fixedly connected to the output end of the box clamping device push rod motor; a box clamping plate, of which a horizontal end is embedded in a sliding slot of the box clamping device support; a box clamping plate telescopic frame motor, fixed to the box clamping device support, an output shaft of the box clamping plate telescopic frame motor passing through the box clamping device support to be fixedly connected to one end of a box clamping plate telescopic frame; and a box clamping plate telescopic frame, of which the other end is fixedly connected to a horizontal end of the box clamping plate.

In this solution, the box clamping device and the box clamping device push rod motor arranged in coordination implement horizontal movement of the sealed box body, and the sealed box body can be moved onto the box body conveyor belt. The box body can be conveyed to the box storage warehouse through the box body conveyor belt, which further improves the automation degree of packing for express delivery.

More particularly, driven by the box clamping plate telescopic frame motor, the box clamping plate horizontally moves along the sliding slot of the box clamping device support and clamps the box body. After the box clamping device push rod motor moves the clamped box body by a particular distance, the box clamping plate telescopic frame motor rotates reversely, the box clamping plate loosens the box body, and the box body falls on the box body conveyor belt and is conveyed to the box storage warehouse.

The technical solutions of the present invention further provide an automatic packing method for express delivery, applied to the automatic packing machine for express delivery proposed in any one of the above technical solutions, the method including: weighing a to-be-packed item placed on a weighing mechanism and collecting an image of the to-be-packed item for classification according to the size; controlling, according to a classification result of the to-be-packed item, a box discharging mechanism to perform an operation of discharging a corresponding box body in a folded state; after the box body in the folded state is discharged out of a box discharging port, a box body unfolding mechanism transversely and longitudinally moving to adjust transverse and longitudinal spacing of a sucker, so as to match the box body in the folded state; adsorbing two suckers of the box body unfolding mechanism to two sides of the box body in the folded state respectively, an adsorption device where the sucker is located moving to unfold the box body, and after the adsorption device drives the unfolded box body to move to a box closing working area, restoring the box body unfolding mechanism to an initial state; a lower box closing tool steering engine, a lower box closing tool, a lower box closing fan blade steering engine, and a lower box closing fan blade of a box closing mechanism coordinating to close a bottom surface of the unfolded box body; a weighing plate steering engine of the weighing mechanism tilting a weighing plate, the to-be-packed item slipping into the unfolded box body, and an upper box closing tool steering engine, an upper box closing tool, an upper box closing fan blade steering engine, and an upper box closing fan blade of the box closing mechanism coordinating to close a top surface of the box body where the to-be-packed item is placed; the box sealing mechanism moving to seal the closed box body; and a box clamping device in a conveying mechanism clamping the box body, and moving the box body to a box body conveyor belt under the push of a box clamping device push rod motor, and the box body conveyor belt conveying the box body to a box storage warehouse.

In this solution, coordination between mechanical structures and a control system implements automatic weighing of to-be-packed items, and also implements packaging items of different sizes and types by using box bodies of different specifications. The box body unfolding process is stable and reliable, with less loss to the machine, which reduces the failure rate of the machine, prolongs the service life of the machine, integrates weighing, discharging, box body unfolding, closing, sealing, and conveying functions, has a higher degree of automation and a wider application range, and can implement operations on box bodies of different specifications in the same machine.

Through the above technical solutions, a box discharging mechanism, a weighing mechanism, a box body unfolding mechanism, a box closing mechanism, a box sealing mechanism, a conveying mechanism, and a controller are arranged in coordination. Coordination between mechanical structures and a control system implements automatic weighing and packing for express delivery, which is stable and reliable. The machine occupies less space, has a low failure rate and a long service life, integrates weighing, discharging, box body unfolding, closing, sealing, and conveying functions, has a higher degree of automation and a wider application range, and can implement packaging of items of different sizes and types by using box bodies of different specifications and can implement operations on box bodies of different specifications in the same machine.

A part of additional aspects and advantages of the present invention will be given in the following description, and a part thereof will become apparent from the description below or be known through the practice of the present invention.

BRIEF DESCRIPTION OF DRAWINGS

The above and/or additional aspects and advantages of the present invention will become apparent and easily understood from the description of embodiments with reference to the accompanying drawings below. In the drawings.

FIG. 3 is a schematic partial structural diagram of the weighing mechanism in

FIG. 2;

Figure 1:
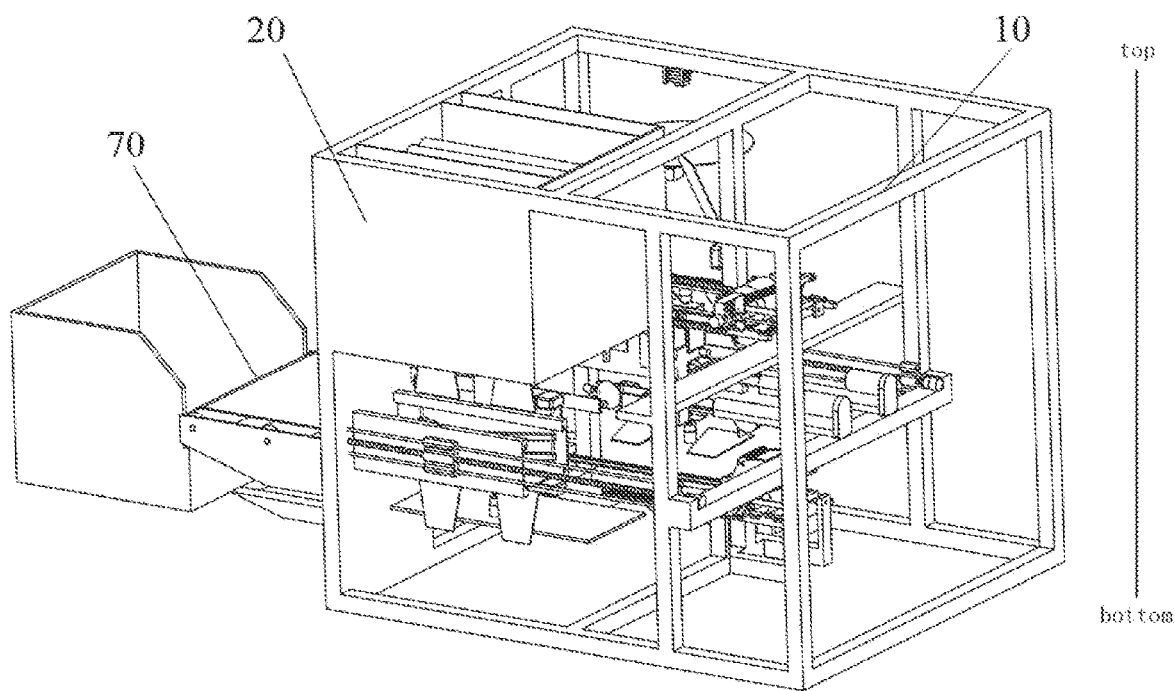
FIG. 1 is a schematic structural diagram of an automatic packing machine for express delivery according to an embodiment of the present invention.

Corresponding relationships between reference signs in FIG. 1 to FIG. 13 and members are as follows:

10: frame, 20: box discharging mechanism, 202: folding box storage portion, 204: elastic box pressing plate; 206: box discharging conveyor belt, 208: box discharging conveyor belt motor, 210: box discharging port; 30: weighing mechanism, 302: weighing plate, 304: weighing plate steering engine, 306: image collecting module, 40: box body unfolding mechanism, 402: telescopic mechanism, 4022: ball screw, 4024: optical shaft, 4026: support seat, 4028: telescopic frame fixed sliding block, 4029: unfolding mechanism motor, 4030: first telescopic frame support plate, 4032: second telescopic frame support plate, 4034: embedded pin, 4035: telescopic rod push rod motor, 4036: telescopic rod, 404: transverse moving mechanism, 4042: transverse ball screw, 4044: bearing housing, 4046: transverse sliding block, 4048: sucker transverse motion motor, 4050: sucker, 406: longitudinal moving mechanism, 4062: longitudinal ball screw support plate, 4064: longitudinal ball screw, 4066: sucker longitudinal motion motor, 4068: longitudinal sliding block, 50: box closing mechanism, 502: upper box closing tool steering engine, 504: lower box closing tool steering engine, 506: upper box closing tool, 508: lower box closing tool, 510: upper box closing fan blade steering engine, 512: lower box closing fan blade steering engine, 514: upper box closing fan blade, 516: lower box closing fan blade, 60: box sealing mechanism, 602: box sealing device optical shaft, 604: rack, 605: gear, 606: box sealing device, 6062: box sealing device body, 6064: box sealing device sliding block, 6066: U-shaped bracket, 6068: box sealing device side plate, 6070: box sealing device rotating shaft, 6072: tape roller, 6074: tape pressing roller, 6076: tension spring, 6078: I-shaped bracket, 6079: rubber tapping tool, 608: box sealing device driving motor, 70: conveying mechanism, 702: box clamping plate telescopic frame motor, 7022: box clamping device support, 7024: box clamping plate, 7026: box clamping plate telescopic frame motor, 7028: box clamping plate telescopic frame, 704: box clamping device push rod motor, 706: box body conveyor belt, and 708: box storage warehouse.

DETAILED DESCRIPTION OF PREFERRED EMBODIMENTS

In order to better understand the objectives, features, and advantages of the present invention, the present invention is described below in further detail with reference to the accompanying drawings and specific implementations. It should be noted that without a conflict, the embodiments of this application and the features in the embodiments may be combined with each other.

Many specific details are set forth in the following description to facilitate a full understanding of the present invention. However, the present invention may be implemented in other manners other than those described herein. Therefore, the protection scope of the present invention is not limited by the specific embodiments disclosed below.

An automatic packing machine according to an embodiment of the present invention is specifically described below with reference to FIG. 1 to FIG. 13.

Figure 2:
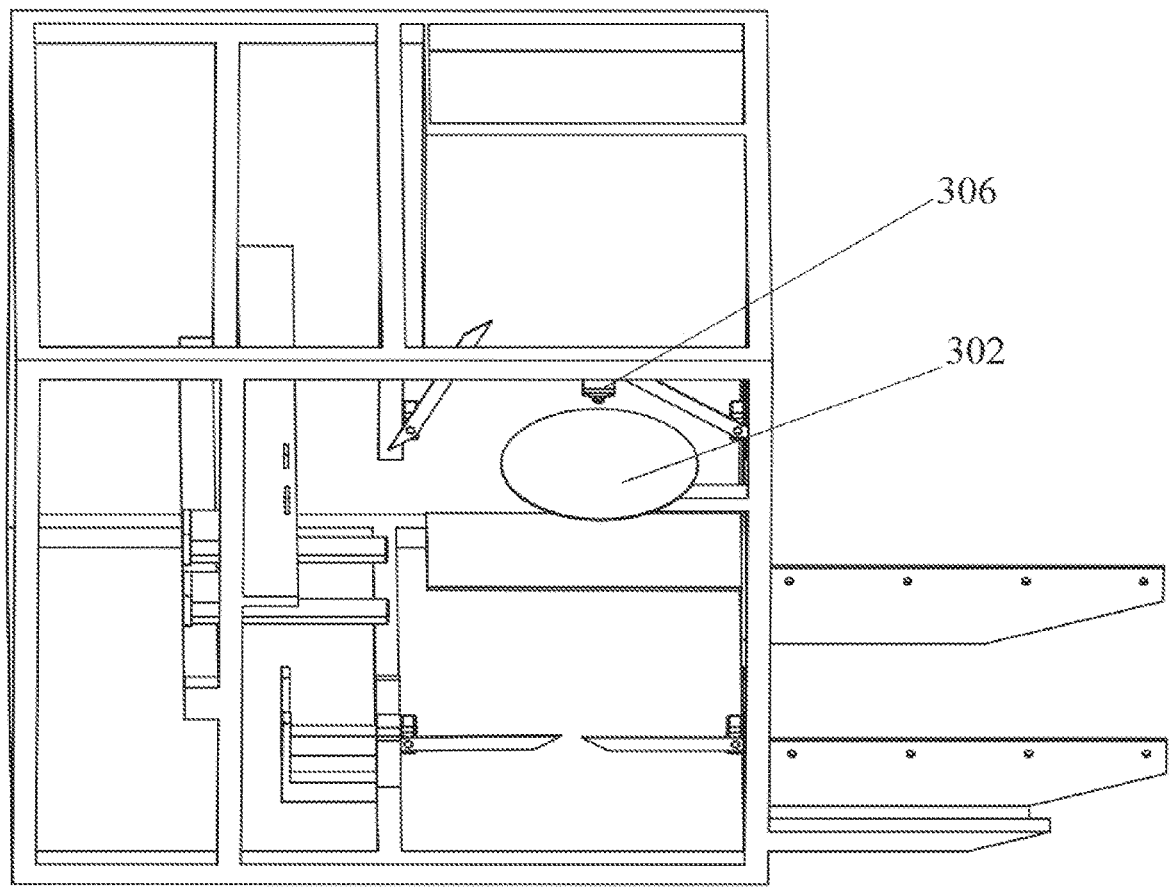
FIG. 2 is a schematic structural diagram of a weighing mechanism of the automatic packing machine for express delivery in FIG. 1.
Figure 3:
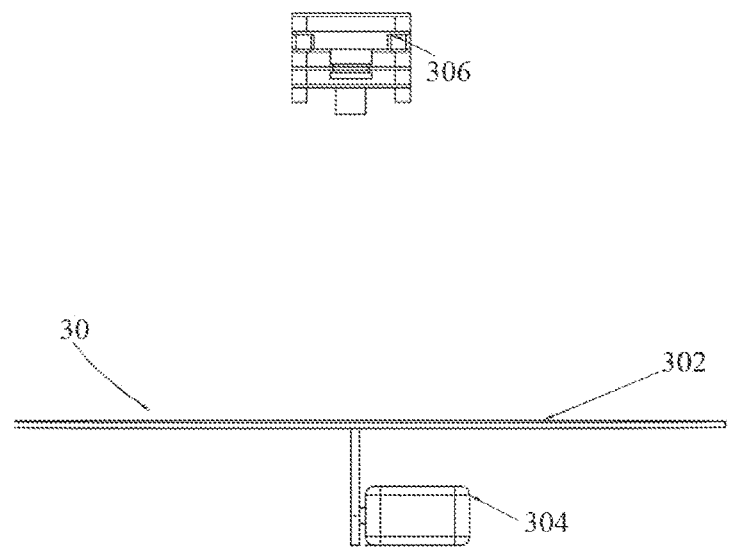

As shown in FIG. 1 to FIG. 3, the automatic packing machine according to the embodiment of the present invention includes: a frame 10; a box discharging mechanism 20, fixed to one side of the top end of the frame 10; a weighing mechanism 30, fixed to a middle-upper part of the frame 10, the weighing mechanism 30 being adjacent to the box discharging mechanism 20, the weighing mechanism 30 including a weighing plate 302 and a weighing plate steering engine 304 which are arranged in coordination, the weighing plate steering engine 304 being fixed to a cross rod on the middle-upper part of the frame 10, the weighing plate 302 being fixed to the weighing plate steering engine 304, the weighing mechanism 30 further including an image collecting module 306, the image collecting module 306 being fixed to a cross rod at the top end of the frame 10, and the image collecting module 306 facing the weighing plate 302 and being located over the weighing plate 302; a box body unfolding mechanism 40, fixed to a middle-lower part of the frame 10, the box body unfolding mechanism 40 and the box discharging mechanism 20 being arranged in coordination, and the box body unfolding mechanism 40 corresponding to a box discharging port 210 of the box discharging mechanism 20 and being configured to unfold a box body discharged out of the box discharging port 210; a box closing mechanism 50, fixed to the middle-lower part of the frame 10, the box closing mechanism 50 being arranged in coordination with the box body unfolding mechanism 40 and being configured to close the unfolded box body moved by the box body unfolding mechanism 40; a box sealing mechanism 60, including upper and lower box sealing devices, wherein the upper sealing device is fixed to the middle-upper part of the frame 10, a fixed position height of the upper box sealing device is lower than that of the weighing mechanism 30, the lower box sealing device is fixed to the middle-lower part of the frame 10, and the box sealing mechanism 60 is arranged in coordination with the box body unfolding mechanism 40 and the box closing mechanism 50 and is configured to seal the closed box body; a conveying mechanism 70, fixed to the bottom of the frame 10 and configured to convey the sealed box body; and a controller (not marked in the figures), connected to the box discharging mechanism 20, the weighing mechanism 30, the box body unfolding mechanism 40, the box closing mechanism 50, the box sealing mechanism 60, and the conveying mechanism 70 respectively.

In the solution, the box discharging mechanism 20, the weighing mechanism 30, the box body unfolding mechanism 40, the box closing mechanism 50, the box sealing mechanism 60, and the conveying mechanism 70 are relatively compact in structure, which can effectively improve the efficiency of automatic packing. Moreover, the cooperation between these mechanical structures and the controller improves the automation of the whole packing for express delivery, and the unfolding process of the box body is stable and reliable, with less loss to the machine, which improves the stability and reliability of the automatic packing machine for express delivery as a whole, reduces the failure rate of the machine to some extent, and prolongs the service life of the machine. Besides, the automatic packing machine for express delivery is low in production costs and suitable for mass production.

Particularly, a to-be-packed item is placed on the weighing plate 302 of the weighing mechanism 30 for weighing the to-be-packed item, the image collecting module 306 analyzes the size of the to-be-packed item and feeds back it to the box discharging mechanism 20, the box discharging mechanism 20 discharges a box according to the size of the to-be-packed item fed back by the image collecting module 306, the box body unfolding mechanism 40 unfolds a box body discharged out of the box discharging port 210, the box closing mechanism 50 closes a bottom surface of the unfolded box body moved from the box body unfolding mechanism 40, the weighing plate steering engine 304 rotates to tilt the weighing plate 302, the to-be-packed item slips into the box body, the box closing mechanism 50 closes a top surface of the box body, the box sealing mechanism 60 seals the closed box body, and the conveying mechanism 70 conveys the sealed box body.

It should be noted that the image collecting module 306 herein may be an openMV machine vision module. Particularly, with an STM32F427CPU single chip microcomputer as a control core and integrated with an OV7725 camera technology, a camera can collect images of to-be-packed items, sizes of the to-be-packed items are judged for classification through a machine vision algorithm, such as pixel size, the STM32F427CPU single chip microcomputer gives the box discharging mechanism 20 an instruction according to the sizes and categories of the to-be-packed items, and the box discharging mechanism 20 performs an operation of discharging box bodies with different specifications.

Figure 4:
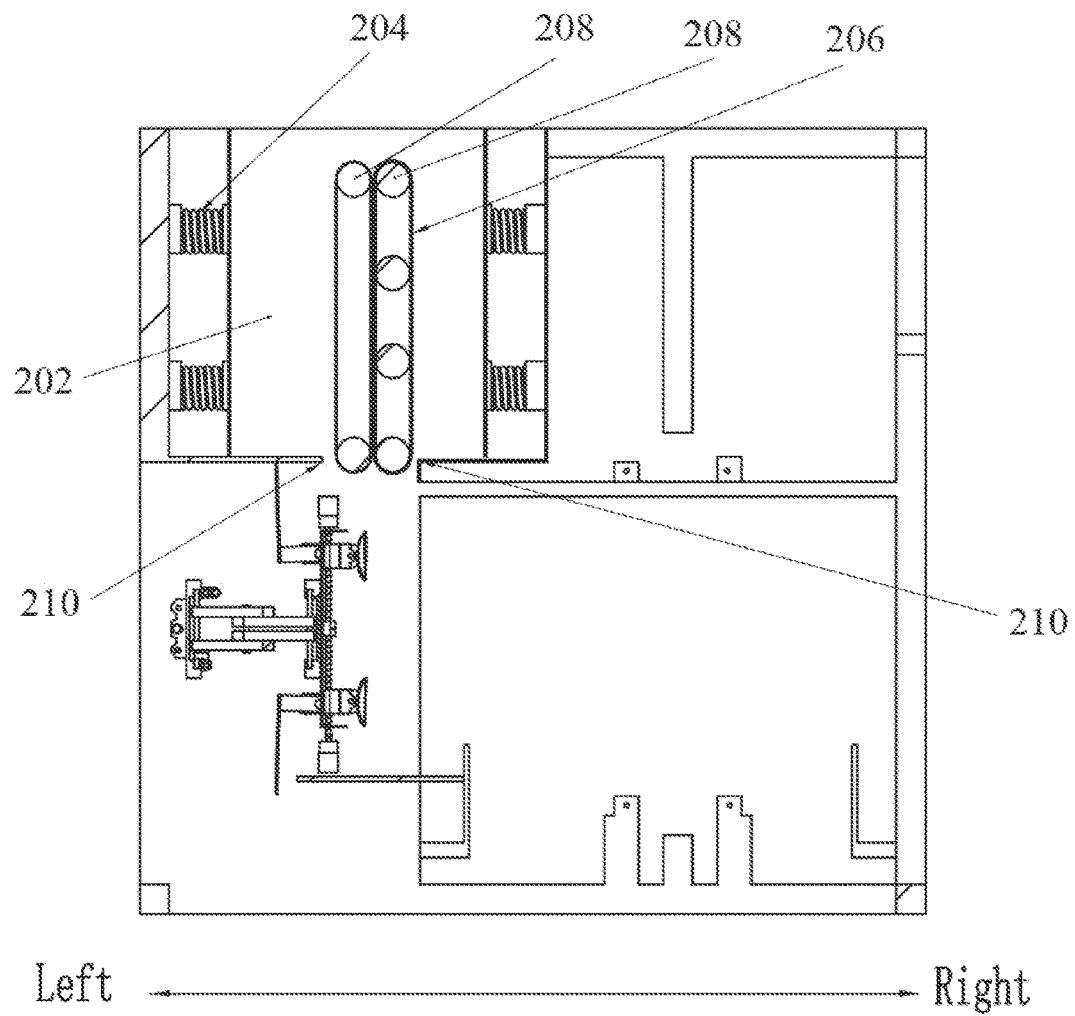
FIG. 4 is a schematic structural diagram of a box discharging mechanism of the automatic packing machine for express delivery in FIG. 1.

As shown in FIG. 4, the box discharging mechanism 20 includes: a folding box storage portion 202, fixed to one side of the top end of the frame 10; an elastic box pressing plate 204, fixed to an inner side of a sidewall of the folding box storage portion 202 and configured to extrude a box body in a folded state; a box discharging conveyor belt 206 and a box discharging conveyor belt motor 208 arranged in coordination and arranged in the folding box storage portion 202, the extruded box body in the folded state being between the box discharging conveyor belt 206 and the elastic box pressing plate 204; and the box discharging port 210, arranged adjacent to the box discharging conveyor belt 206 and located between the box discharging conveyor belt and the elastic box pressing plate 204, wherein the box discharging conveyor belt motor 208 drives the box discharging conveyor belt 206 to rotate and then takes the box body in the folded state out of the box discharging port 210.

In this solution, a box body in a folded state can be accommodated and stored through the folding box storage portion 202, and the box body in the folded state is extruded through the elastic box pressing plate 204 fixed to an inner side of a sidewall of the folding box storage portion 202, which, on the one hand, with the decrease in the number of box bodies, causes the following box bodies to move toward the box discharging conveyor belt 206, and on the other hand, when the box discharging conveyor belt 206 does not operate, effectively reduces occurrence of free fall of the box bodies, can take the box body in the folded state out of the box discharging port 210 through coordination between the box discharging conveyor belt 206, the box discharging conveyor belt motor 208, and the box discharging port 210, basically guarantees taking out a single box body, facilitates the implementation of subsequent operations such as box unfolding, and ensures high stability and reliability of box discharging.

Two sets of box discharging conveyor belts 206 and box discharging conveyor belt motors 208 arranged adjacent to each other divide the folding box storage portion 202 into two folding box storage spaces; there are two sets of elastic box pressing plates 204, arranged on inner sides of sidewalls of the two folding box storage spaces respectively, and arranged corresponding to the box discharging conveyor belts 206; and two box discharging ports 210 arranged in coordination with the elastic box pressing plates 204 and the box discharging conveyor belts 206 form two sets of box discharging components that one-to-one correspond to the two folding box storage spaces and are configured to discharge box bodies in the folding box storage spaces.

In this solution, two sets of box discharging conveyor belts 206 and box discharging conveyor belt motors 208 are arranged to divide the folding box storage portion 202 into two folding box storage spaces, and two sets of elastic box pressing plates 204 and the box discharging ports 210 form two sets of box discharging components, which can implement operations of discharging box bodies of different specifications, then present box bodies of different specifications according to sizes of to-be-packed items, and implements automatic packing of items of various sizes and types on the same automatic packing machine for express delivery, thereby having high work efficiency.

In addition, structural layout can be performed according to requirements, and multiple sets of box discharging components can be arranged to implement operations of discharging box bodies of more specifications.

The two box discharging ports 210 have different widths, and the width of the box discharging port 210 matches the thickness of a single box body in a folded state placed in the corresponding folding box storage space.

In this solution, the width of the box discharging port 210 matches the thickness of a single box body in a folded state placed in the corresponding folding box storage space. Herein, the two box discharging ports 210 have different widths to match discharging of box bodies of two different specifications. For example, the width of one box discharging port 210 is 9 mm, and the width of the other box discharging port 210 is 6 mm.

Figure 5:
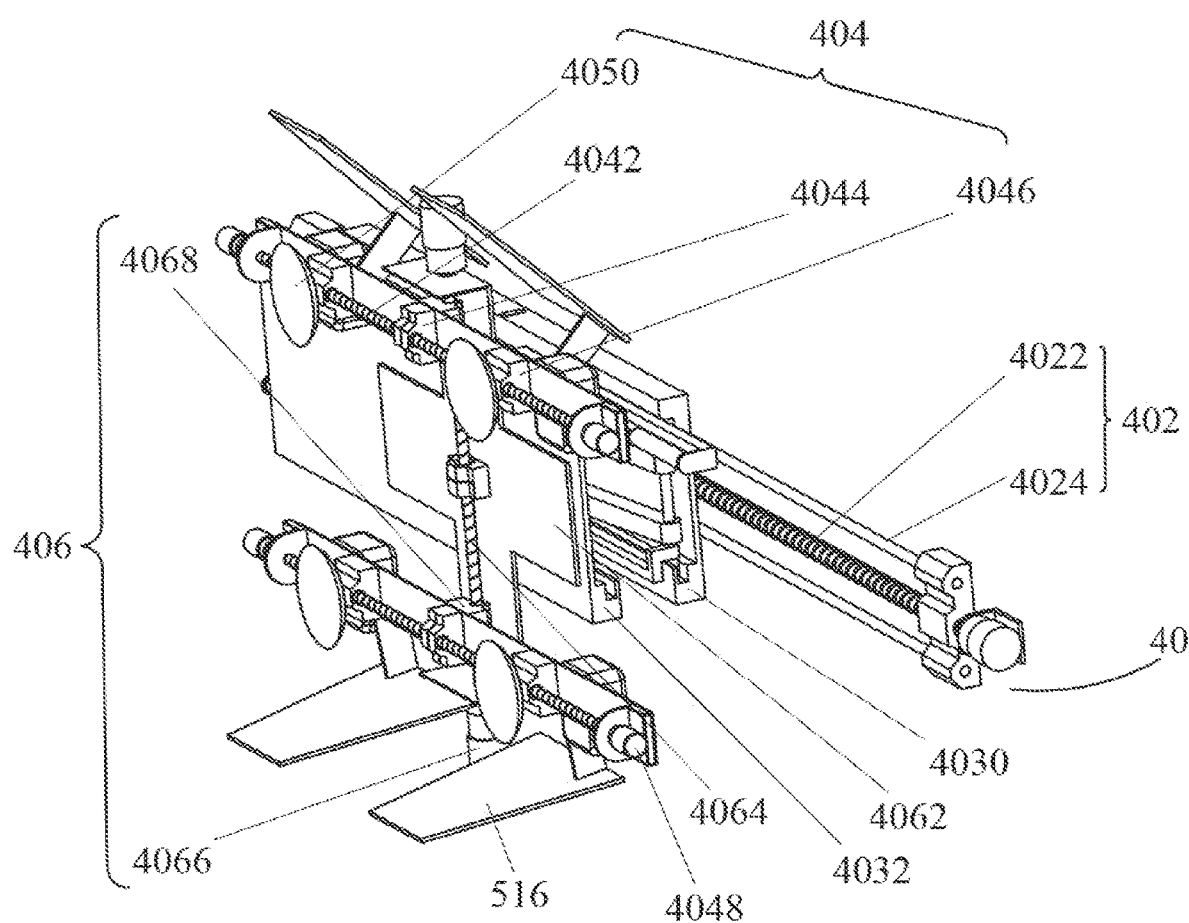
FIG. 5 is a schematic partial structural diagram of a box body unfolding mechanism of the automatic packing machine for express delivery in FIG. 1.
Figure 6:
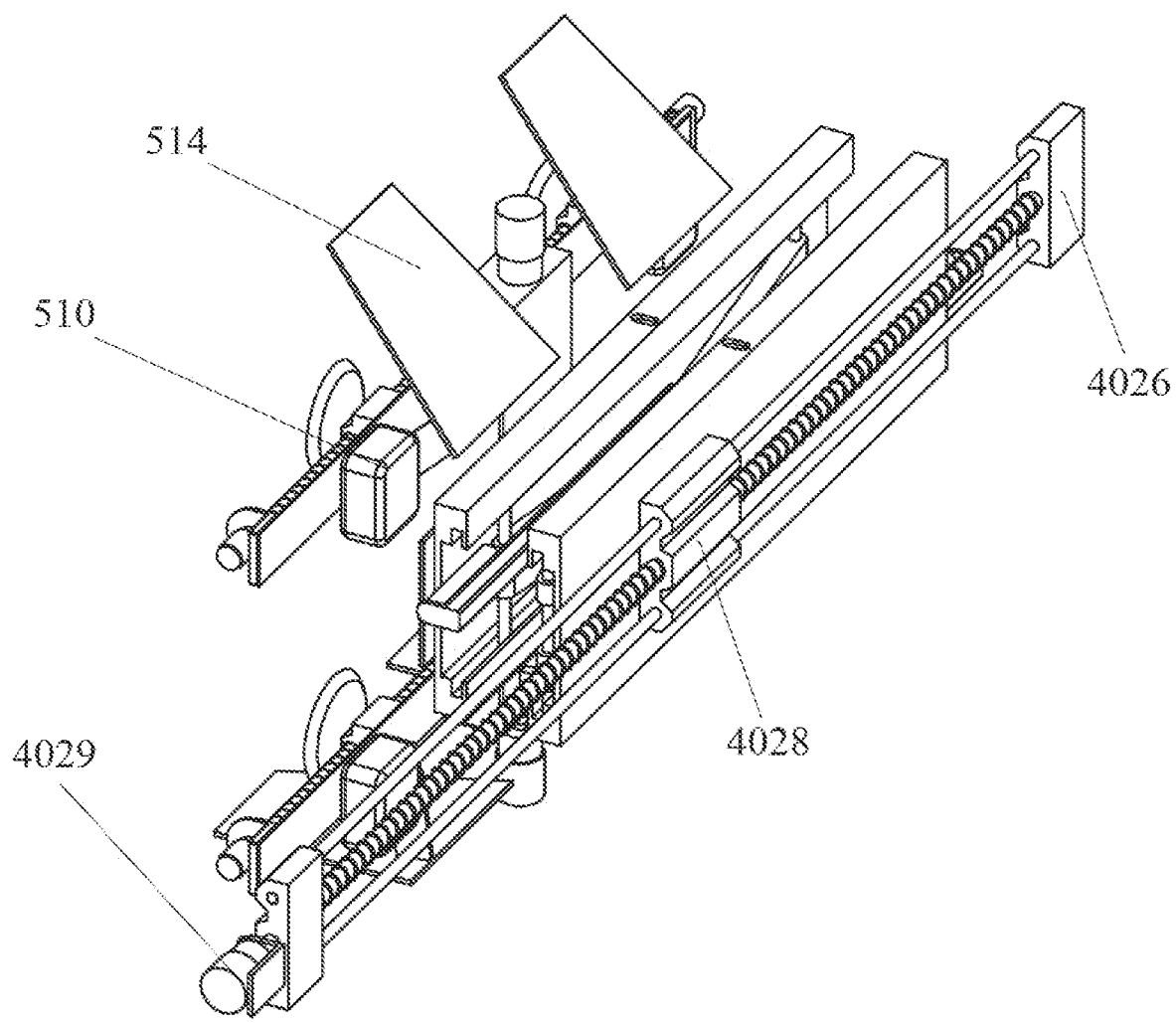
FIG. 6 is a schematic partial structural diagram of a box body unfolding mechanism of the automatic packing machine for express delivery in FIG. 1.
Figure 7:
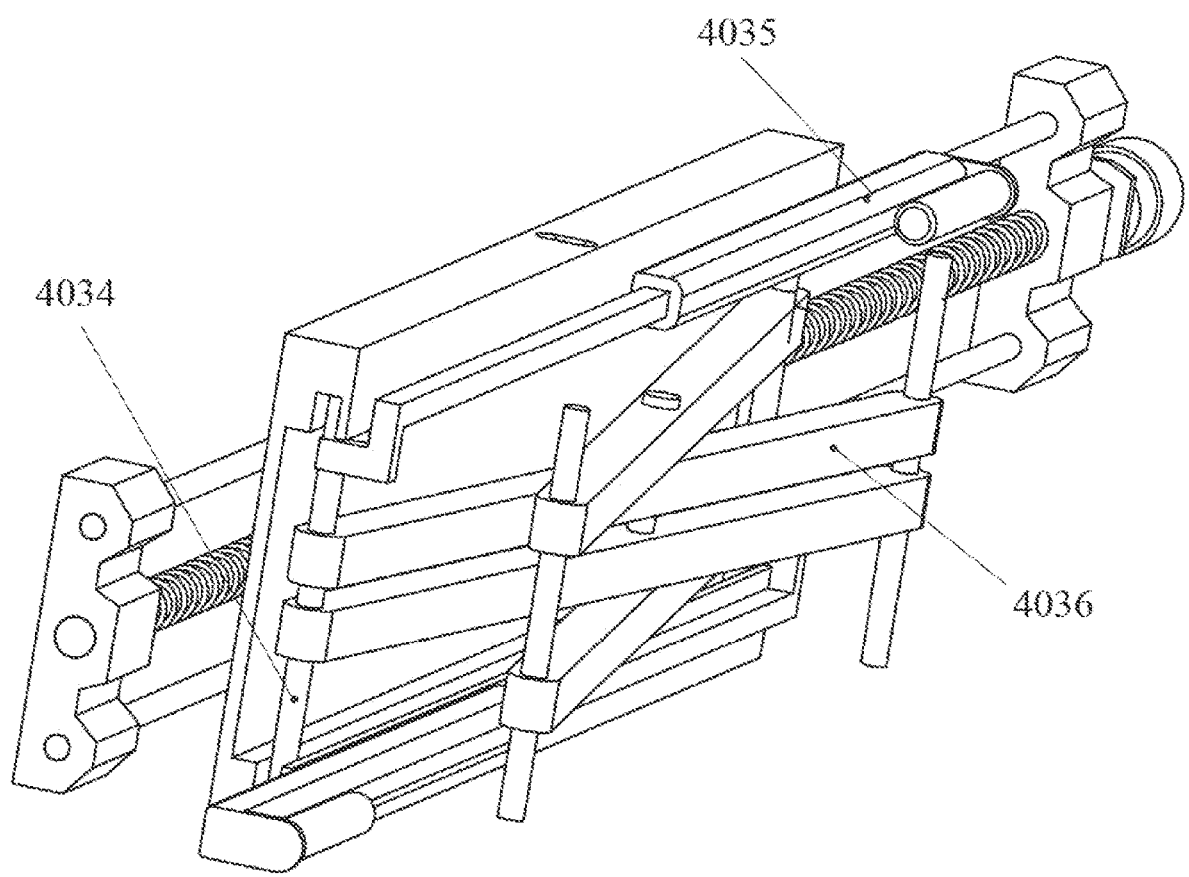
FIG. 7 is a schematic partial structural diagram of a box body unfolding mechanism of the automatic packing machine for express delivery in FIG. 1.

As shown in FIG. 5 to FIG. 7, the box body unfolding mechanism 40 includes two adsorption devices arranged opposite to each other, and each of the adsorption devices includes a telescopic mechanism 402, a transverse moving mechanism 404, and a longitudinal moving mechanism 406 arranged in coordination, the telescopic mechanism 402 includes: a ball screw 4022 and an optical shaft 4024 arranged in coordination and fixed to the frame 10 through a support seat 4026; a telescopic frame fixed sliding block 4028, sleeving the ball screw 4022 and the optical shaft 4024, the ball screw 4022 being connected to an unfolding mechanism motor 4029 that drives the box body unfolding mechanism 40 through the telescopic frame fixed sliding block 4028 to move as a whole; two opposite telescopic frame support plates, denoted as a first telescopic frame support plate 4030 and a second telescopic frame support plate 4032 respectively, the first telescopic frame support plate 4030 being fixed to a side surface of the telescopic frame fixed sliding block 4028; an embedded pin 4034, clamped into a sliding slot on the telescopic frame support plate, the embedded pin 4034 being connected to a telescopic rod push rod motor 4035, and driven by the telescopic rod push rod motor 4035, the embedded pin 4034 moving along the sliding slot on the telescopic frame support plate; a telescopic rod 4036, two ends of the telescopic rod 4036 being rotationally connected to the embedded pin 4034, and the embedded pin 4034 driving the telescopic rod 4036 to move, upper and lower transverse moving mechanisms 404 are arranged, each of the transverse moving mechanisms 404 includes: a transverse ball screw, 4042 fixed to a transverse ball screw 4042 support plate through a bearing housing 4044; a transverse sliding block 4046, sleeving the transverse ball screw 4042; a sucker transverse motion motor 4048, connected to the transverse ball screw 4042, the sucker transverse motion motor 4048 driving the transverse ball screw 4042 to rotate, and the transverse sliding block 4046 moving along the transverse ball screw 4042; a sucker 4050, fixedly connected to the transverse sliding block 4046, and the longitudinal moving mechanism 406 includes: a longitudinal ball screw support plate 4062, fixedly connected to the second telescopic frame support plate 4032; a longitudinal ball screw 4064, fixed to the longitudinal ball screw support plate 4062; a sucker longitudinal motion motor 4066, connected to the longitudinal ball screw 4064; and a longitudinal sliding block 4068, sleeving the longitudinal ball screw 4064, the longitudinal sliding block 4068 moving up and down along the longitudinal ball screw 4064, and the transverse ball screw 4042 support plate being fixed to the longitudinal sliding block 4068.

In this solution, the box body unfolding mechanism 40 includes two adsorption devices arranged opposite to each other, and each of the adsorption devices includes a telescopic mechanism 402, a transverse moving mechanism 404, and a longitudinal moving mechanism 406 arranged in coordination. The transverse moving mechanism 404 and the longitudinal moving mechanism 406 can transverse and longitudinal movement of the box body unfolding mechanism 40 and adjust adsorption positions on the box body, so that the unfolding process of the box body is more stable and reliable, with less loss to the machine, which reduces the failure rate of the machine and prolongs the service life of the machine.

Particularly, the unfolding mechanism motor 4029 rotates to drive the box body unfolding mechanism 40 through the telescopic frame fixed sliding block 4028 to move as a whole. Under the action of the sucker 4050 transverse motion motor, the transverse ball screw 4042 rotates, the transverse sliding block 4046 moves along the transverse ball screw 4042, and transverse spacing of the sucker 4050 is adjusted. Driven by the sucker longitudinal motion motor 4066, the longitudinal sliding block 4068 drives the transverse ball screw 4042 support plate to move along the longitudinal ball screw 4064, so as to adjust longitudinal spacing of the upper and lower suckers 4050. The transverse and longitudinal spacing of the suckers 4050 are adjusted to implement smooth adsorption of box bodies of different specifications. The two adsorption devices are adsorbed on two sides of the box body, the telescopic rod 4036 expands or contracts under the action of the telescopic rod push rod motor 4035 to implement box unfolding, and the unfolded box body moves to a box closing working area with the two adsorption devices.

Figure 8:
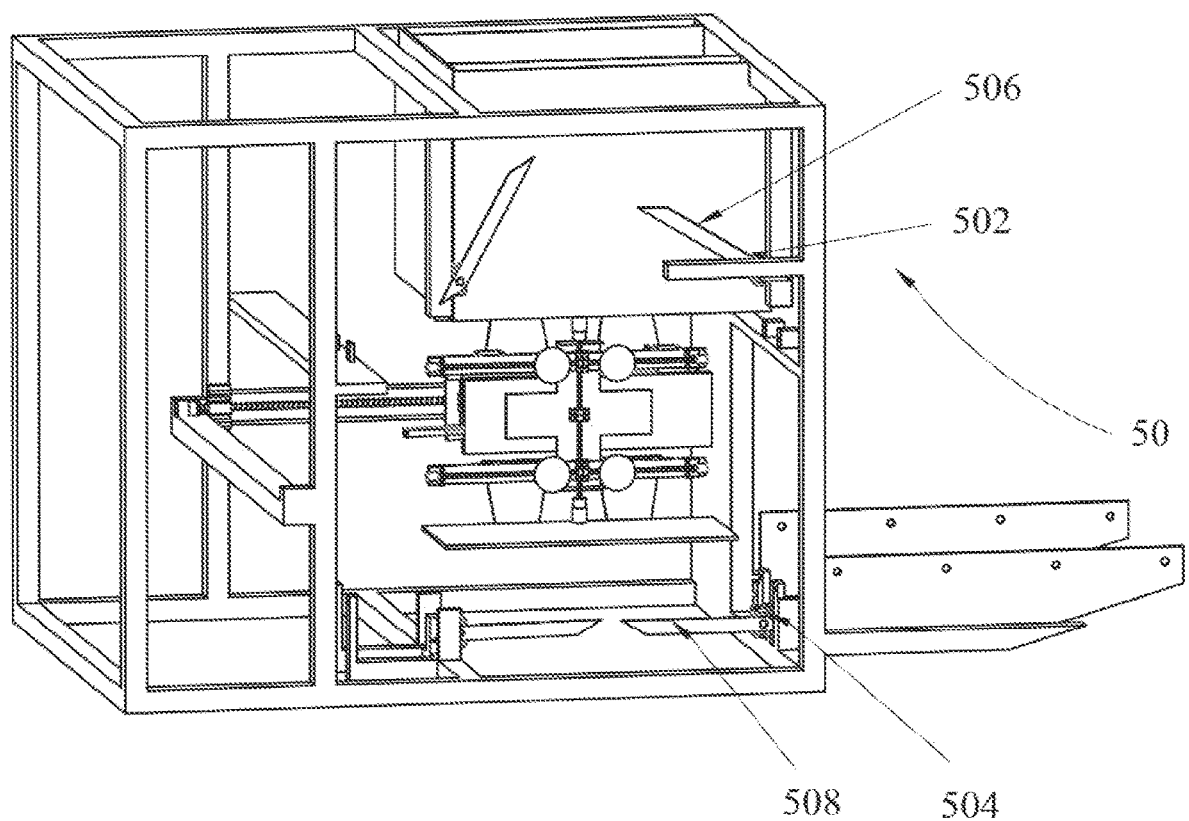
FIG. 8 is a schematic partial structural diagram of a box closing mechanism of the automatic packing machine for express delivery in FIG. 1.

As shown in FIG. 5, FIG. 6, and FIG. 8, the box closing mechanism 50 includes: an upper box closing tool steering engine 502 and a lower box closing tool steering engine 504 arranged in coordination and fixed to the frame 10; an upper box closing tool 506 and a lower box closing tool 508, correspondingly fixedly mounted to output ends of the upper box closing tool steering engine 502 and the lower box closing tool steering engine 504; an upper box closing fan blade steering engine 510 and a lower box closing fan blade steering engine 512 arranged in coordination and fixed to the transverse ball screw 4042 support plate; and an upper box closing fan blade 514 and a lower box closing fan blade 516, correspondingly connected to output ends of the upper box closing fan blade steering engine 510 and the lower box closing fan blade steering engine 512.

In this solution, the upper box closing tool steering engine 502 drives the upper box closing tool 506 to rotate by a particular angle to complete a box closing action of two corresponding box body blades, and the upper box closing fan blade steering engine 510 drives the upper box closing fan blade 514 to rotate to complete a box closing action of the other two corresponding box body blades, so as to implement closing of the top surface of the box body. Likewise, the lower box closing tool steering engine 504 drives the lower box closing tool 508 to rotate by a particular angle to complete a box closing action of two corresponding box body blades, and the lower box closing fan blade steering engine 512 drives the lower box closing fan blade 516 to rotate to complete a box closing action of the other two corresponding box body blades, so as to implement closing of the bottom surface of the box body. The box closing stability is better, the box closing effect is better, and the box closing consistency is better.

More particularly, the lower box closing tool steering engine 504 drives the lower box closing tool 508 to rotate by a particular angle to complete sealing of two blades on the bottom surface of the box body, and then the lower box closing fan blade steering engine 512 drives the lower box closing fan blade 516 to rotate to complete sealing of the other two blades on the bottom surface of the box body. After the item enters the box body, the upper box closing tool steering engine 502 drives the upper box closing tool 506 to rotate by a particular angle to complete sealing of two blades on the top surface of the box body, then the upper box closing fan blade steering engine 510 drives the upper box closing fan blade 514 to rotate to complete sealing of the other two blades on the top surface of the box body, and finally the upper box closing tool 506 and the lower box closing tool 508 are restored to an original position under the driving of the corresponding steering engine.

Figure 9:
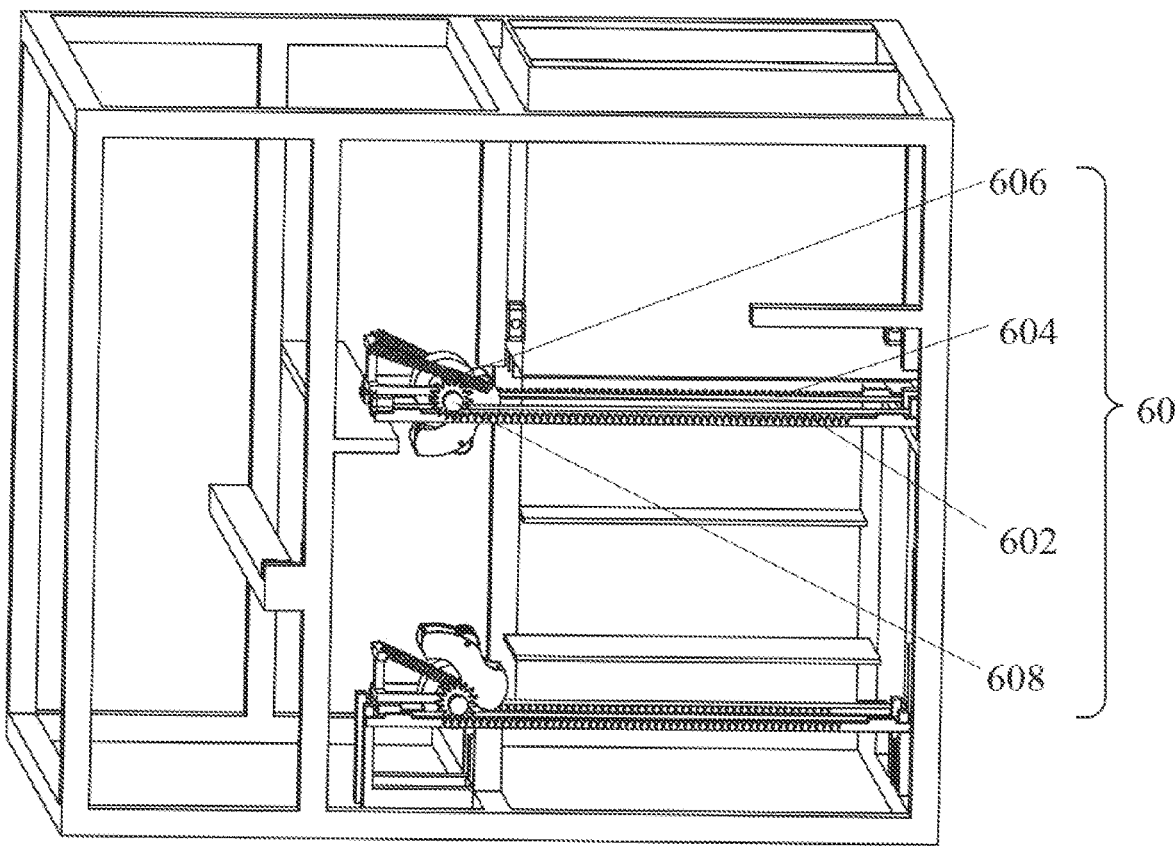
FIG. 9 is a schematic structural diagram of a box sealing mechanism of the automatic packing machine for express delivery in FIG. 1.
Figure 10:
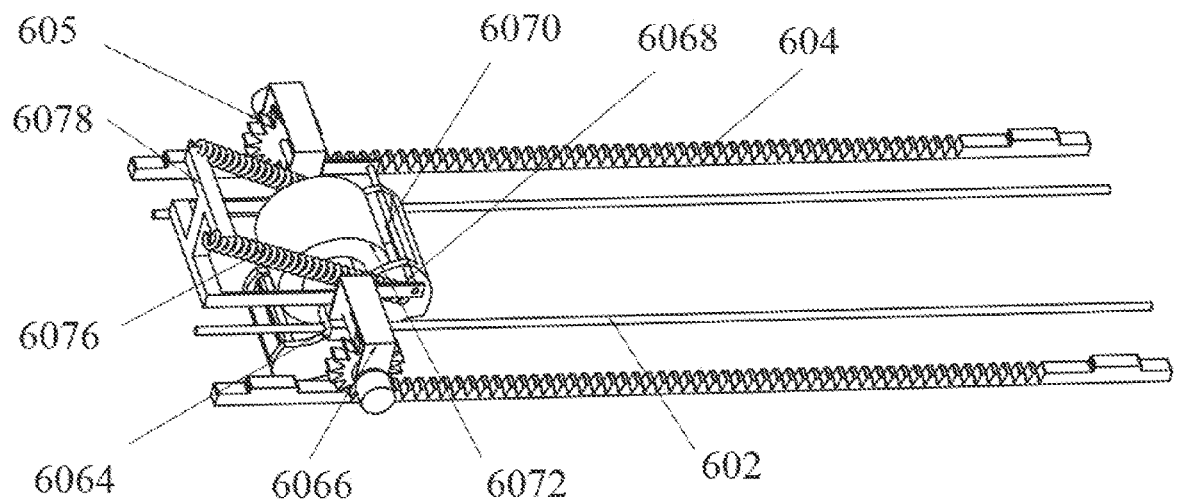
FIG. 10 is a schematic partial structural diagram of the box sealing mechanism in FIG. 9.
Figure 11:
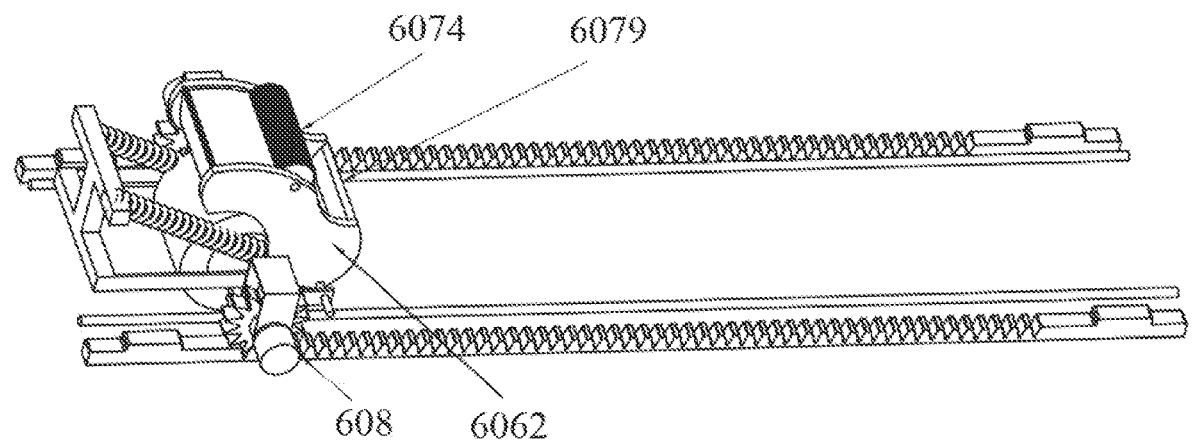
FIG. 11 is a schematic partial structural diagram of the box sealing mechanism in FIG. 9.

As shown in FIG. 9 to FIG. 11, the box sealing mechanism 60 includes an upper sealing device and a lower sealing device configured to seal upper and low box openings respectively, the sealing device including: a box sealing device optical shaft 602 and a rack 604 arranged in coordination and fixedly connected to the frame 10; a box sealing device 606, arranged on the rack 604 through a gear 605, and moving along the rack 604 under engagement of the gear 605 and the rack 604; and a box sealing device driving motor 608, connected to the gear 605, and configured to drive the gear 605 to move along the rack 604 and drive the box sealing device 606 to horizontally move.

In this solution, the upper and lower box openings are sealed through the upper sealing device and the lower sealing device, and the sealing device consists of a box sealing device optical shaft 602, a rack 604, a box sealing device 606, and a box sealing device driving motor 608. The device is simple, and has a good sealing effect and a high degree of automation As shown in FIG. 10 and FIG. 11, the box sealing device 606 includes: a box sealing device body 6062; a box sealing device sliding block 6064, sleeving the box sealing device optical shaft 602, and connected to the box sealing device driving motor 608 through a U-shaped bracket 6066; a box sealing device side plate 6068, fixedly connected to the box sealing device sliding block 6064; a box sealing device rotating shaft 6070 running through the box sealing device body 6062, and two ends thereof being connected to the box sealing device side plate 6068; a tape roller 6072 and a tape pressing roller 6074 arranged in coordination and arranged in the box sealing device body 6062; a tension spring 6076, of which one end is connected to one end at the top of an I-shaped bracket 6078, and the other end is connected to the box sealing device body 6062; and a rubber tapping tool 6079, arranged on the box sealing device body 6062 and arranged in coordination with the tape pressing roller 6074.

More particularly, before box sealing, a section of a tape on the tape roller 6072 extends out, and a non-viscous surface of the extended tape is overlaid on the tape pressing roller 6074. Driven by the box sealing device driving motor 608, the gear 605 drives the box sealing device 606 to horizontally move. Box sealing starts when a viscous surface of the tape comes into contact with a side surface of the box body. The box sealing device 606 is extruded by the box body to clockwise rotate around the box sealing device rotating shaft 6070, and the tension spring 6076 is under a tensile state. At the same time, the tape pressing roller 6074 presses the tape on the box body, and as the box sealing device 606 continues to move horizontally, the tape is constantly pulled out and stuck on the box body to complete packaging of the upper surface. The box sealing device 606 continues to move forward away from the upper surface of the box body, and the tape pressing roller 6074 then attaches the tape to the side surface of the other end of the box body. When the tension spring 6076 is pulled to a particular extent, the tension spring 6076 drives the box sealing device 606 to rotate counterclockwise around the box sealing device rotating shaft 6070, and the rubber tapping tool 6079 then cuts off the tape to complete a sealing operation on the upper surface. The sealing operation on the lower surface of the box body is completed by the lower box sealing device. The principle and sealing process are the same as the sealing of the upper surface of the box body, and are not described in detail here.

Figure 12:
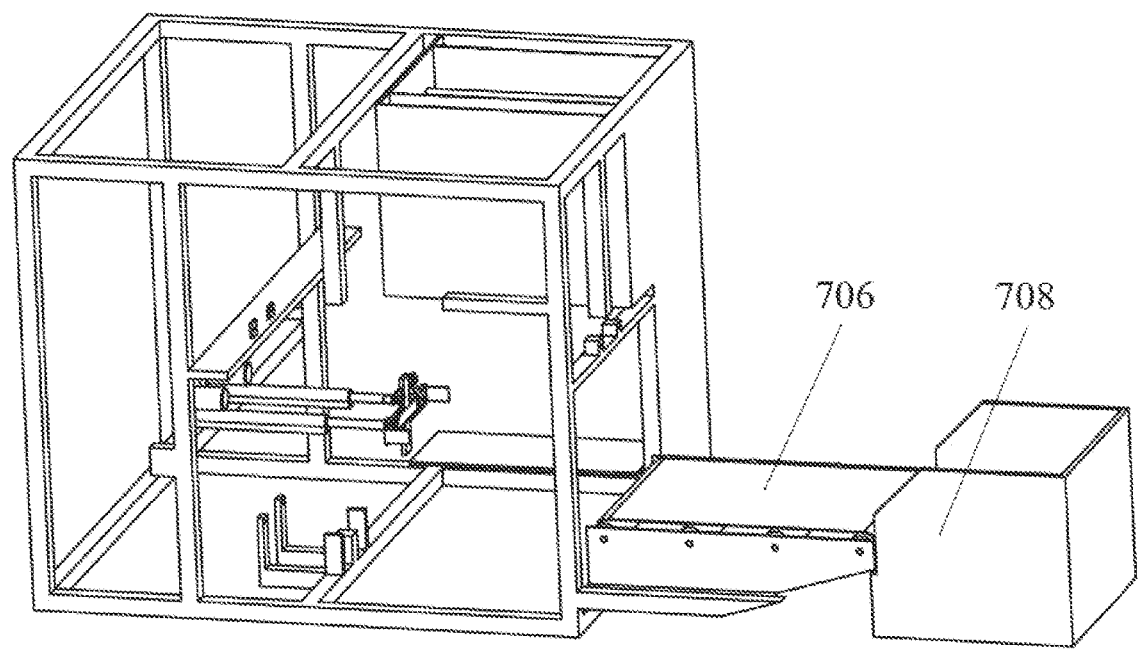
FIG. 12 is a schematic structural diagram of a conveying mechanism of the automatic packing machine for express delivery in FIG. 1.
Figure 13:
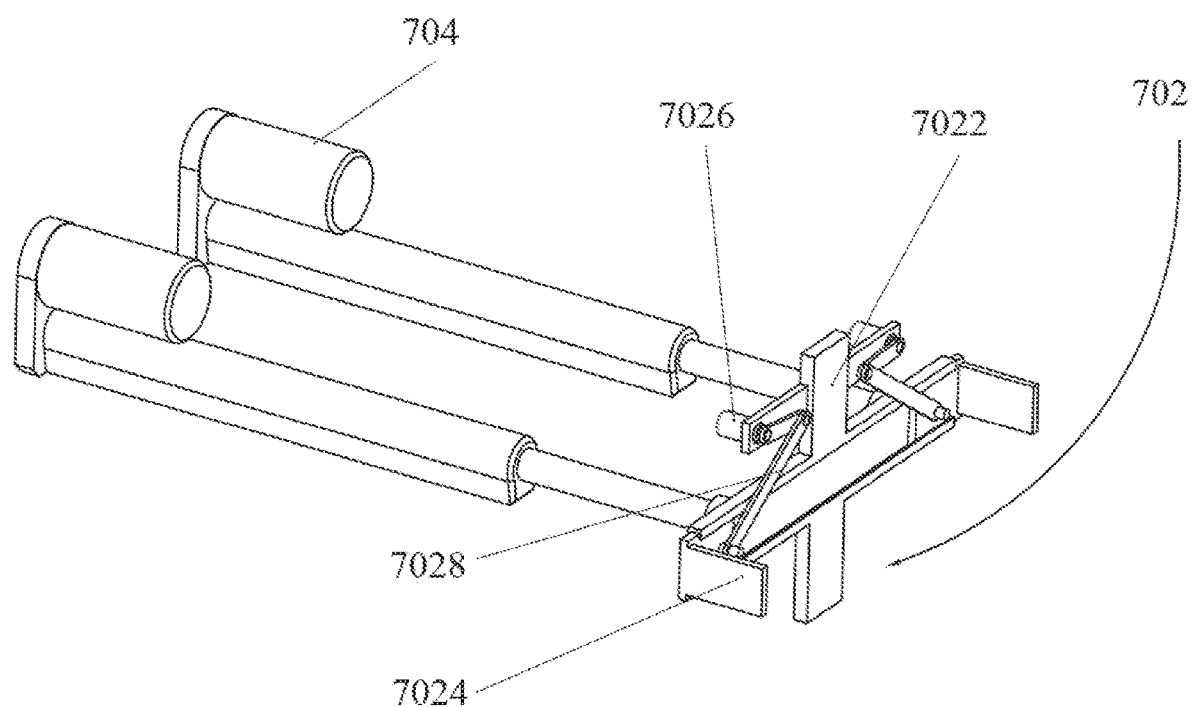
FIG. 13 is a schematic partial structural diagram of the conveying mechanism in FIG. 12.

As shown in FIG. 12 and FIG. 13, the conveying mechanism 70 includes: a box clamping device 702 and a box clamping device push rod motor 704 arranged in coordination and fixedly connected to the frame 10, an output end of the box clamping device push rod motor 704 being fixedly connected to the box clamping device 702; a box body conveyor belt 706, fixedly connected to one side at the bottom end of the frame 10; and a box storage warehouse 708, connected to the box body conveyor belt 706. The box clamping device 702 includes: a box clamping device support 7022, fixedly connected to the output end of the box clamping device push rod motor 704; a box clamping plate 7024, of which a horizontal end is embedded in a sliding slot of the box clamping device support 7022; a box clamping plate telescopic frame motor 7026, fixed to the box clamping device support 7022, an output end of the box clamping plate telescopic frame motor 7026 passing through the box clamping device support 7022 to be fixedly connected to one end of a box clamping plate telescopic frame 7028; and the box clamping plate telescopic frame 7028, of which the other end is fixedly connected to the horizontal end of the box clamping plate 7024.

In this solution, the box clamping device 702 and the box clamping device push rod motor 704 arranged in coordination implement horizontal movement of the sealed box body, and the sealed box body can be moved onto the box body conveyor belt 706. The box body can be conveyed to the box storage warehouse 708 through the box body conveyor belt 706, which further improves the automation degree of packing for express delivery.

More particularly, driven by the box clamping plate telescopic frame motor 7026, the box clamping plate 7024 horizontally moves along the sliding slot of the box clamping device support 7022 and clamps the box body. After the box clamping device push rod motor 704 moves the clamped box body by a particular distance, the box clamping plate telescopic frame motor 7026 rotates reversely, the box clamping plate 7024 loosens the box body, and the box body falls on the box body conveyor belt 706 and is conveyed to the box storage warehouse 708.

The working process of the automatic packing machine for express delivery proposed in the present invention is as follows:

a to-be-packed item is placed on the weighing plate 302 of the weighing mechanism 30, the item is weighed through a pressure sensor, the image collecting module 306 completes analysis of the size of the item and feeds back the size to the box discharging mechanism 20, a box discharging conveyor belt motor 208A drives a box discharging conveyor belt 206A to rotate, the box discharging conveyor belt 206A rotates an A-shaped paper box to pass through a left box discharging port 210, or a box discharging conveyor belt motor 208B drives a box discharging conveyor belt 206B to rotate, the box discharging conveyor belt 206B drives a B-shaped paper box to pass through a right box discharging port 210, the box body unfolding mechanism 40 works, the unfolding mechanism motor 4029 rotates, the box body unfolding mechanism 40 is driven to transversely move through the telescopic frame fixed sliding block 4028, under the action of the sucker transverse motion motor 4048, the transverse ball screw 4042 rotates, the transverse sliding block 4046 moves along the transverse ball screw 4042, transverse spacing of the sucker 4050 is adjusted, driven by the sucker longitudinal motion motor 4066, and the longitudinal sliding block 4068 drives the transverse ball screw 4042 support plate to move along the longitudinal ball screw 4064, so as to adjust longitudinal spacing of the upper and lower suckers 4050. The transverse and longitudinal spacing of the suckers 4050 are adjusted to implement smooth adsorption of box bodies of different specifications. The two adsorption devices are adsorbed on two sides of the box body, the telescopic rod 4036 expands or contracts under the action of the telescopic rod push rod motor 4035 to implement box unfolding, and the unfolded box body moves to a box closing working area with the two adsorption devices. The box closing mechanism 50 starts to work. The lower box closing tool steering engine 504 drives the lower box closing tool 508 to rotate by a particular angle to complete sealing of two blades on the bottom surface of the box body, and then the lower box closing fan blade steering engine 512 drives the lower box closing fan blade 516 to rotate to complete sealing of the other two blades on the bottom surface of the box body. Then the weighing plate steering engine 304 rotates clockwise by 90 degrees to tilt the weighing plate 302, and the item falls into the box body. After the item enters the box body, the upper box closing tool steering engine 502 drives the upper box closing tool 506 to rotate by a particular angle to complete sealing of two blades on the top surface of the box body, then the upper box closing fan blade steering engine 510 drives the upper box closing fan blade 514 to rotate to complete sealing of the other two blades on the top surface of the box body, and finally the upper box closing tool 506 and the lower box closing tool 508 are restored to an original position under the driving of the corresponding steering engine. Then the box sealing mechanism 60 starts to work. When box sealing is not performed, a section of a tape on the tape roller 6072 extends out, and a non-viscous surface of the extended tape is overlaid on the tape pressing roller 6074. Driven by the box sealing device driving motor 608, the gear 605 drives the box sealing device 606 to horizontally move. Box sealing starts when a viscous surface of the tape comes into contact with a side surface of the box body. The box sealing device 606 is extruded by the box body to clockwise rotate around the box sealing device rotating shaft 6070, and the tension spring 6076 is under a tensile state. At the same time, the tape pressing roller 6074 presses the tape on the box body, and as the box sealing device 606 continues to move horizontally, the tape is constantly pulled out and stuck on the box body to complete packaging of the upper surface. The box sealing device 606 continues to move forward away from the upper surface of the box body, and the tape pressing roller 6074 then attaches the tape to the side surface of the other end of the box body. When the tension spring 6076 is pulled to a particular extent, the tension spring 6076 drives the box sealing device 606 to rotate counterclockwise around the box sealing device rotating shaft 6070, and the rubber tapping tool 6079 then cuts off the tape to complete a sealing operation on the upper surface. Meanwhile, the sealing operation on the lower surface is completed likewise. Then, the conveying mechanism 70 starts to work. The box clamping device push rod motor 704 pushes the box clamping device 702 to an appropriate position. Driven by the box clamping plate telescopic frame motor 7026, the box clamping plate 7024 horizontally moves along the sliding slot of the box clamping device support 7022 and clamps the box body. After the box clamping device push rod motor 704 moves the clamped box body by a particular distance, the box clamping plate telescopic frame motor 7026 rotates reversely, the box clamping plate 7024 loosens the box body, and the box body falls on the box body conveyor belt 706 and is conveyed to the box storage warehouse 708.

An automatic packing method for express delivery according to an embodiment of the present invention is provided, applied to the automatic packing machine for express delivery according to any one of the above embodiments, the method including:

weighing a to-be-packed item placed on a weighing mechanism and collecting an image of the to-be-packed item for classification according to the size; controlling, according to a classification result of the to-be-packed item, a box discharging mechanism to perform an operation of discharging a corresponding box body in a folded state; after the box body in the folded state is discharged out of a box discharging port, a box body unfolding mechanism transversely and longitudinally moving to adjust transverse and longitudinal spacing of a sucker, so as to match the box body in the folded state; adsorbing two suckers of the box body unfolding mechanism to two sides of the box body in the folded state respectively, an adsorption device where the sucker is located moving to unfold the box body, and after the adsorption device drives the unfolded box body to move to a box closing working area, restoring the box body unfolding mechanism to an initial state; a lower box closing tool steering engine, a lower box closing tool, a lower box closing fan blade steering engine, and a lower box closing fan blade of a box closing mechanism coordinating to close a bottom surface of the unfolded box body; a weighing plate steering engine of the weighing mechanism tilting a weighing plate, the to-be-packed item slipping into the unfolded box body, and an upper box closing tool steering engine, an upper box closing tool, an upper box closing fan blade steering engine, and an upper box closing fan blade of the box closing mechanism coordinating to close a top surface of the box body where the to-be-packed item is placed; the box sealing mechanism moving to seal the closed box body; and a box clamping device in a conveying mechanism clamping the box body, and moving the box body to a box body conveyor belt under the push of a box clamping device push rod motor, and the box body conveyor belt conveying the box body to a box storage warehouse.

In this solution, coordination between mechanical structures and a control system implements automatic weighing of to-be-packed items, and also implements packaging items of different sizes and types by using box bodies of different specifications. The box body unfolding process is stable and reliable, with less loss to the machine, which reduces the failure rate of the machine, prolongs the service life of the machine, integrates weighing, discharging, box body unfolding, closing, sealing, and conveying functions, has a higher degree of automation and a wider application range, and can implement operations on box bodies of different specifications in the same machine.

The technical solutions of the present invention are described above in detail with reference to the accompanying drawings. The present invention proposes an automatic packing machine for express delivery and an automatic packing method for express delivery. A box discharging mechanism, a weighing mechanism, a box body unfolding mechanism, a box closing mechanism, a box sealing mechanism, a conveying mechanism, and a controller are arranged in coordination. Coordination between mechanical structures and a control system implements automatic weighing and packing for express delivery, which is stable and reliable. The machine occupies less space, has a low failure rate and a long service life, integrates weighing, discharging, box body unfolding, closing, sealing, and conveying functions, and has a higher degree of automation and a wider application range. Besides, items of different sizes and types are packaged by using box bodies of different specifications, and operations on box bodies of different specifications can be implemented in the same machine.

In the present invention, the terms "first," "second," and "third" are merely for the purpose of description, but cannot be understood as indicating or implying relative importance. The term "multiple" means two or more unless otherwise explicitly defined. The terms "mount," "connect with," "connect," "fix," and the like shall be understood in a broad sense. For example, "connect" may mean being fixedly connected, detachably connected, or integrally connected; and "connect with" may mean being directly connected or indirectly connected through an intermediary. For those of ordinary skill in the art, specific meanings of the above terms in the present invention can be understood according to specific situations.

In the description of the present invention, it should be understood that if orientation or position relations indicated by the terms such as "upper," "lower," "left," "right," "front," "back," and the like are based on the orientation or position relations shown in the drawings, and the terms are intended only to facilitate the description of the present invention and simplify the description, rather than indicating or implying that the apparatus or element referred to must have a particular orientation and be constructed and operated in the particular orientation, and therefore cannot be construed as a limitation on the present invention.

In the description of the specification, the descriptions about the terms "an embodiment," "some embodiments," "specific embodiment(s)," and the like mean that specific features, structures, materials or characteristics described in combination with the embodiment(s) or example(s) are included in at least one embodiment or example of the present invention. In the specification, schematic expressions of the above terms do not necessarily refer to the same embodiment or example. Moreover, the specific features, structures, materials or characteristics described may be combined in a suitable manner in any one or more embodiments or examples.

The above are merely preferred embodiments of the present invention and are not intended to limit the present invention. The present invention may be subject to changes and variations for those skilled in the art. Any modifications, equivalent replacements, and improvements made within the spirit and principles of the present invention shall all be encompassed in the protection scope of the present invention.

What is claimed is:

1. An automatic packing machine for express delivery, comprising:
   a frame;
   a box discharging mechanism, fixed to one side of a top end of the frame;
   a weighing mechanism, fixed to a middle-upper part of the frame, the weighing mechanism being adjacent to the box discharging mechanism, the weighing mechanism comprising a weighing plate and a weighing plate steering engine which are arranged in coordination, the weighing plate steering engine being fixed to a cross rod on the middle-upper part of the frame, the weighing plate being fixed to the weighing plate steering engine, the weighing mechanism further comprising an image collecting module, the image collecting module being fixed to a cross rod at the top end of the frame, and the image collecting module facing the weighing plate and being located over the weighing plate;
   a box body unfolding mechanism, fixed to a middle-lower part of the frame, the box body unfolding mechanism and the box discharging mechanism being arranged in coordination, and the box body unfolding mechanism corresponding to a box discharging port of the box discharging mechanism and being configured to unfold a box body discharged out of the box discharging port; the box body unfolding mechanism comprising an adsorption device that comprises a set of transverse moving mechanisms and a longitudinal moving mechanism; each set of transverse moving mechanisms comprising a transverse support plate, a transverse ball screw, a transverse sliding block, a sucker transverse motion motor, and at least two suckers; the transverse ball screw being fixed to the transverse support plate through a bearing housing, the transverse sliding block sleeving the transverse ball screw, the sucker transverse motion motor being connected to the transverse ball screw, the sucker transverse motion motor driving the transverse ball screw to rotate, the transverse sliding block moving along the transverse ball screw, and the sucker being fixedly connected to the transverse sliding block; the longitudinal moving mechanism comprising a longitudinal support plate, a longitudinal ball screw, a sucker longitudinal motion motor, and a longitudinal sliding block; the longitudinal support plate being fixedly connected to a second telescopic frame support plate; the longitudinal ball screw being fixed to the longitudinal support plate; the sucker longitudinal motion motor being connected to the longitudinal ball screw; the longitudinal sliding block sleeving the longitudinal ball screw, the longitudinal sliding block moving up and down along the longitudinal ball screw, and the transverse support plate being fixed to the longitudinal sliding block; the sucker longitudinal motion motor and the sucker transverse motion motor being connected to a controller, being capable of receiving size information of the box body sent by a box discharging control device, and adaptively adjusting transverse and longitudinal spacing of the suckers according to the size information of the box body;
   a box closing mechanism, fixed to the middle-lower part of the frame, the box closing mechanism being arranged in coordination with the box body unfolding mechanism and being configured to close the unfolded box body moved by the box body unfolding mechanism;
   a box sealing mechanism, comprising upper and lower box sealing devices, wherein the upper sealing device is fixed to the middle-upper part of the frame, a fixed position height of the upper box sealing device is lower than that of the weighing mechanism, the lower box sealing device is fixed to the middle-lower part of the frame, and the box sealing mechanism is arranged in coordination with the box body unfolding mechanism and the box closing mechanism and is configured to seal the closed box body;
   a conveying mechanism, fixed to a bottom end of the frame and configured to convey the sealed box body, the conveying mechanism comprising: a box clamping device and a box clamping device push rod motor arranged in coordination and fixedly connected to the frame, an output end of the box clamping device push rod motor being fixedly connected to the box clamping device; a box body conveyor belt, fixedly connected to one side at the bottom end of the frame; and a box storage warehouse, connected to the box body conveyor belt; and
   the controller, connected to the box discharging mechanism, the weighing mechanism, the box body unfolding mechanism, the box closing mechanism, the box sealing mechanism, and the conveying mechanism respectively,
   wherein a to-be-packed item is placed on the weighing plate of the weighing mechanism for weighing the to-be-packed item, the image collecting module analyzes the size of the to-be-packed item and feeds back the size to the box discharging mechanism, the box discharging mechanism discharges a box according to the size of the to-be-packed item fed back by the image collecting module, the box body unfolding mechanism unfolds a box body discharged out of the box discharging mechanism, the box closing mechanism closes a bottom surface of the unfolded box body moved from the box body unfolding mechanism, the weighing plate steering engine rotates to tilt the weighing plate, the to-be-packed item slips into the box body, the box closing mechanism closes a top surface of the box body, the box sealing mechanism seals the closed box body, and the conveying mechanism conveys the sealed box body.

2. The automatic packing machine for express delivery according to claim 1, wherein the box discharging mechanism comprises:
   a folding box storage portion, fixed to one side of the top end of the frame;
   an elastic box pressing plate, fixed to an inner side of a sidewall of the folding box storage portion and configured to extrude a box body in a folded state;
   a box discharging conveyor belt and a box discharging conveyor belt motor arranged in coordination and arranged in the folding box storage portion, the extruded box body in the folded state being between the box discharging conveyor belt and the elastic box pressing plate; and the box discharging port, arranged adjacent to the box discharging conveyor belt and located between the box discharging conveyor belt and the elastic box pressing plate, wherein the box discharging conveyor belt motor drives the box discharging conveyor belt to rotate and then takes the box body in the folded state out of the box discharging port.

3. The automatic packing machine for express delivery according to claim 2, wherein two sets of box discharging conveyor belts and box discharging conveyor belt motors arranged adjacent to each other divide the folding box storage portion into two folding box storage spaces;

there are two sets of elastic box pressing plates, arranged on inner sides of sidewalls of the two folding box storage spaces respectively, and arranged corresponding to the box discharging conveyor belts; and two box discharging ports arranged in coordination with the elastic box pressing plates and the box discharging conveyor belts form two sets of box discharging components that one-to-one correspond to the two folding box storage spaces and are configured to discharge box bodies in the folding box storage spaces.

4. The automatic packing machine for express delivery according to claim 3, wherein the two box discharging ports have different widths, and the width of the box discharging port matches the thickness of a single box body in a folded state placed in the corresponding folding box storage space.

5. The automatic packing machine for express delivery according to claim 4, wherein there are two adsorption devices which are arranged opposite to each other, and each of the adsorption devices comprises a telescopic mechanism, a longitudinal moving mechanism, and a set of transverse moving mechanisms arranged in coordination;

the telescopic mechanism comprises:

a ball screw and an optical shaft arranged in coordination and fixed to the frame through a support seat;

a telescopic frame fixed sliding block, sleeving the ball screw and the optical shaft, the ball screw being connected to an unfolding mechanism motor that drives the box body unfolding mechanism through the telescopic frame fixed sliding block to move as a whole;

two opposite telescopic frame support plates, denoted as a first telescopic frame support plate and the second telescopic frame support plate respectively, the first telescopic frame support plate being fixed to a side surface of the telescopic frame fixed sliding block;

an embedded pin, clamped into a sliding slot on the telescopic frame support plate, the embedded pin being connected to a telescopic rod push rod motor, and driven by the telescopic rod push rod motor, the embedded pin moving along the sliding slot on the telescopic frame support plate; and a telescopic rod, two ends of the telescopic rod being rotationally connected to the embedded pin, and the embedded pin driving the telescopic rod to move;

two sets of transverse moving mechanisms are arranged up and down correspondingly.

6. The automatic packing machine for express delivery according to claim 5, wherein the box closing mechanism comprises:

an upper box closing tool steering engine and a lower box closing tool steering engine arranged in coordination and fixed to the frame;

an upper box closing tool and a lower box closing tool, correspondingly fixedly mounted to output ends of the upper box closing tool steering engine and the lower box closing tool steering engine;

an upper box closing fan blade steering engine and a lower box closing fan blade steering engine arranged in coordination and fixed to the transverse support plate; and an upper box closing fan blade and a lower box closing fan blade, correspondingly connected to output ends of the upper box closing fan blade steering engine and the lower box closing fan blade steering engine.

7. The automatic packing machine for express delivery according to claim 6, wherein the box sealing mechanism comprises an upper sealing device and a lower sealing device configured to seal upper and low box openings respectively, the sealing device comprising:

a box sealing device optical shaft and a rack arranged in coordination and fixedly connected to the frame;

a box sealing device, arranged on the rack through a gear, and moving along the rack under engagement of the gear and the rack; and a box sealing device driving motor, connected to the gear, and configured to drive the gear to move along the rack and drive the box sealing device to horizontally move.

8. The automatic packing machine for express delivery according to claim 7, wherein the box sealing device comprises:

a box sealing device body;

a box sealing device sliding block, sleeving the box sealing device optical shaft, and connected to the box sealing device driving motor through a U-shaped bracket;

a box sealing device side plate, fixedly connected to the box sealing device sliding block;

a box sealing device rotating shaft running through the box sealing device body, and two ends thereof being connected to the box sealing device side plate;

a tape roller and a tape pressing roller arranged in coordination and arranged in the box sealing device body;

a tension spring, of which one end is connected to one end at a top of an I-shaped bracket, and the other end is connected to the box sealing device body; and a rubber tapping tool, arranged on the box sealing device body and arranged in coordination with the tape pressing roller.

9. The automatic packing machine for express delivery according to claim 1, wherein the box clamping device comprises:

a box clamping device support, fixedly connected to the output end of the box clamping device push rod motor;

a box clamping plate, of which a horizontal end is embedded in a sliding slot of the box clamping device support;

a box clamping plate telescopic frame motor, fixed to the box clamping device support, an output shaft of the box clamping plate telescopic frame motor passing through the box clamping device support to be fixedly connected to one end of a box clamping plate telescopic frame; and a box clamping plate telescopic frame, of which the other end is fixedly connected to a horizontal end of the box clamping plate.

10. An automatic packing method for express delivery, applied to the automatic packing machine for express delivery according to claim 1, the method comprising:

weighing a to-be-packed item placed on the weighing mechanism and collecting an image of the to-be-packed item for classification according to the size;

controlling, according to a classification result of the to-be-packed item, the box discharging mechanism to perform an operation of discharging a corresponding box body in a folded state;

after the box body in the folded state is discharged out of a box discharging port, the box body unfolding mechanism transversely and longitudinally moving to adjust transverse and longitudinal spacing of the sucker, so as to match the box body in the folded state;

adsorbing the two suckers of the box body unfolding mechanism to two sides of the box body in the folded state respectively, the adsorption device where the sucker is located moving to unfold the box body, and after the adsorption device drives the unfolded box body to move to a box closing working area, restoring the box body unfolding mechanism to an initial state;

a lower box closing tool steering engine, a lower box closing tool, a lower box closing fan blade steering engine, and a lower box closing fan blade of the box closing mechanism coordinating to close the bottom surface of the unfolded box body;

the weighing plate steering engine of the weighing mechanism tilting the weighing plate, the to-be-packed item slipping into the unfolded box body, and an upper box closing tool steering engine, an upper box closing tool, an upper box closing fan blade steering engine, and an upper box closing fan blade of the box closing mechanism coordinating to close the top surface of the box body where the to-be-packed item is placed;

the box sealing mechanism moving to seal the closed box body; and the box clamping device in the conveying mechanism clamping the box body, and moving the box body to the box body conveyor belt under the push of the box clamping device push rod motor, and the box body conveyor belt conveying the box body to the box storage warehouse.

* * * * *